United States Patent
Cierniak

(10) Patent No.: US 8,832,188 B1
(45) Date of Patent: Sep. 9, 2014

(54) DETERMINING LANGUAGE OF TEXT FRAGMENTS

(75) Inventor: Michal Cierniak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 12/977,334

(22) Filed: Dec. 23, 2010

(51) Int. Cl.
G06F 15/16 (2006.01)
H04L 12/58 (2006.01)

(52) U.S. Cl.
CPC .............. *H04L 51/32* (2013.01); *H04L 12/588* (2013.01)
USPC ........................... 709/204; 709/206; 709/207

(58) Field of Classification Search
USPC ............. 709/201, 202, 204, 205; 704/8, 9, 10
See application file for complete search history.

(56) References Cited

U.S. PATENT DOCUMENTS

| | | | | |
|---|---|---|---|---|
| 5,966,685 A | * | 10/1999 | Flanagan et al. .................. | 704/8 |
| 7,908,132 B2 | * | 3/2011 | Brockett et al. .................. | 704/9 |
| 7,933,810 B2 | * | 4/2011 | Morgenstern ................ | 705/26.1 |
| 2005/0060448 A1 | * | 3/2005 | Gutowitz ........................ | 710/72 |
| 2005/0108426 A1 | * | 5/2005 | Klein ............................. | 709/238 |
| 2006/0004614 A1 | * | 1/2006 | Hutchinson et al. .............. | 705/7 |
| 2007/0005598 A1 | * | 1/2007 | Okamoto et al. .................. | 707/7 |
| 2007/0260975 A1 | * | 11/2007 | Nordenhake .................. | 715/520 |
| 2009/0063557 A1 | * | 3/2009 | MacPherson ............. | 707/103 R |
| 2009/0172514 A1 | * | 7/2009 | Radovanovic ................ | 715/212 |
| 2010/0119053 A1 | * | 5/2010 | Goeldi ..................... | 379/265.09 |
| 2010/0312650 A1 | * | 12/2010 | Pinckney et al. .......... | 705/14.66 |
| 2010/0318571 A1 | * | 12/2010 | Pearlman et al. ............. | 707/784 |
| 2011/0004692 A1 | * | 1/2011 | Occhino et al. ............... | 709/228 |
| 2011/0179116 A1 | * | 7/2011 | Solomon et al. .............. | 709/204 |
| 2012/0005224 A1 | * | 1/2012 | Ahrens et al. ................. | 707/769 |
| 2012/0042263 A1 | * | 2/2012 | Rapaport et al. .............. | 715/753 |
| 2012/0078611 A1 | * | 3/2012 | Soltani et al. ..................... | 704/9 |
| 2012/0151322 A1 | * | 6/2012 | Lindsay et al. ............... | 715/234 |

* cited by examiner

*Primary Examiner* — Dhairya A Patel

(74) *Attorney, Agent, or Firm* — Patent Law Works LLP

(57) ABSTRACT

Methods, systems, and apparatus, including computer programs encoded on a computer storage medium, for receiving content data, the content data comprising text, identifying an author of the text, the author being a user of a social networking service, retrieving data corresponding to one or more social graphs associated with the user, the data being stored in a computer-readable storage device, and determining the language of the text based on the data corresponding to the one or more social graphs associated with the author.

18 Claims, 7 Drawing Sheets

DETERMINING LANGUAGE OF TEXT FRAGMENTS

BACKGROUND

This specification generally relates to determining the language of text, and more particularly to determining the language of short text fragments.

SUMMARY

In general, innovative aspects of the subject matter described in this specification may be embodied in methods that include the actions of receiving content data, the content data comprising text, identifying an author of the text, the author being a user of a social networking service, retrieving data corresponding to one or more social graphs associated with the user, the data being stored in a computer-readable storage device, and determining the language of the text based on the data corresponding to the one or more social graphs associated with the author.

These and other implementations may each optionally include one or more of the following features. For instance, the data includes statistics regarding a plurality of posts that the user has authored in using the social networking service; the data includes statistics regarding a plurality of posts authored by one or more contacts of the user within the social networking service; the data includes statistics regarding a plurality of posts authored by one or more non-contact users, each of the one or more non-contact authors having commented on at least one post authored by the user within the social networking service; the actions further include: generating language data based on the language, transmitting the language data and the content data to a remote computing device, and receiving updated language data, the updated language data having been generated at the remote computing device based on the language data and the content data; the updated language data corresponds to the language determined based on the data corresponding to the one or more social graphs; the updated language data corresponds to another language that is different from the language determined based on the data corresponding to the one or more social graphs; the operations further include associating the content data with the language; associating the content data with the language includes populating language data of a data set with data indicative of the language, the data set including at least the content data and the language data; the content data is provided in a data set that is received at the computing device; the data set is a post data set that is generated in response to a post in the social networking service that is published by the user; the data includes at least one of: distances between the user and other users within one or more social networking services, first statistics based on posts authored by the user within one or more social networking services, second statistics based on posts authored by contacts of the user within one or more social networking services, and third statistics based on comments authored by non-contact commentators who are also users of the one or more social networking services; the data includes an aggregate statistic that is determined based on at least two of the first statistics, the second statistics and the third statistics; the aggregate statistic is further determined based on the distances; the operations further include: indicating the language as a preliminary language, transmitting the content data and the language as inputs for a language analysis, and receiving a notification based on the language analysis; the notification includes an indication that the preliminary language is incorrect; the actions further include receiving a post data set, the post data set comprising the content data and user data, the author of the text is identified based on the user data; and the one or more social graphs is generated based on relationships between the user and other users of the social networking service.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
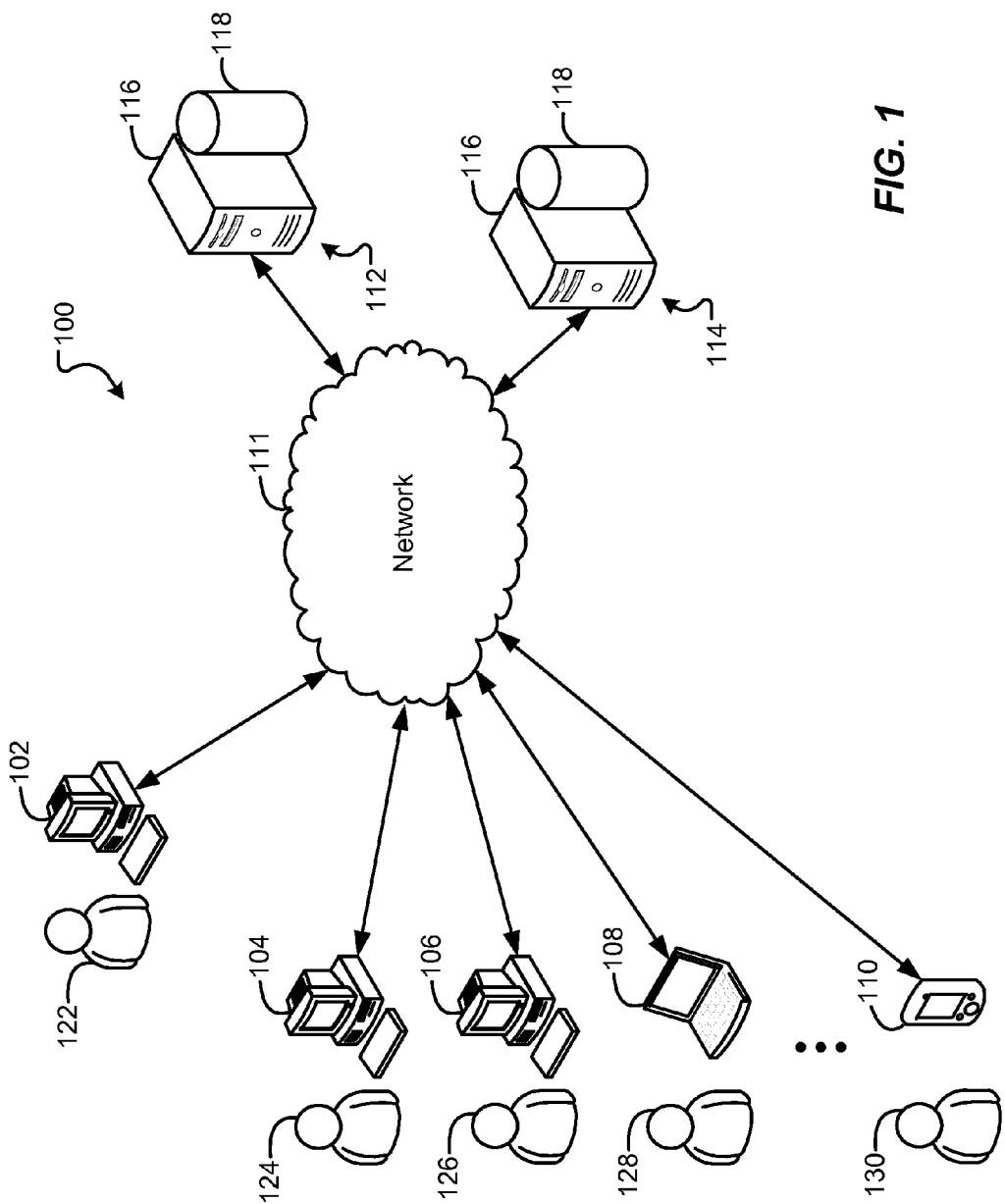
FIG. 1 is a diagram of an example network architecture.

Implementations of the present specification are generally directed to determining the language of text, and more particularly to determining the language of short text fragments. By way of non-limiting example, the subject matter of this specification is described in the context of one or more posts in one or more computer-implemented social networking applications. As described in detail below, each post authored by a user of a social networking application includes textual content. In some instances, the textual content includes short text fragments (e.g., text having less than a threshold number of characters). Implementations of the present specification determine that the textual content is written in a particular language based on a social graph of the user that authored the particular post.

A user of a computing device may subscribe to a social networking service. In an example implementation, the social networking service can include a micro-blogging service. Using the social networking service, the user can submit short textual or multimedia posts to a server system that is hosting the micro-blogging service. The server system may disseminate the posts to computing devices of other users that also subscribe to the micro-blogging service. In particular, some users may "follow" or subscribe to other users, so that when the server system receives a post from a particular user, the server system distributes the post to the other, subscribing users. The post that is received from the user may not include information identifying the other, subscribing users, to which the post is to be distributed. In some implementations, the post may only include an identification of an author of the post, which the server system may use to identify from a database the subscribing users for distribution of the post. In some implementations, the user may never transmit a communication that identifies the other, subscribing users. In some implementations, the server system may only receive identification of the subscribing users in communications that are provided by the subscribing users themselves.

The other users that subscribe to receive posts generated by a particular user may view the user's posts by logging into a website that displays, for each individual other user, a stream of posts that the micro-blogging service pushes, or otherwise distributes, to the individual user (i.e., a computing device that is associated with the user). Each stream of posts may include posts that are authored by other users that the other person "follows" or "subscribes" to. The stream of posts can include posts that the micro-blogging service recommends for the other user, even though the other user has not affirmatively requested to "follow" an author of the recommended posts.

As used herein, a social graph is a digital representation of relationships between an individual user and other users associated with the individual user within one or more computer-implemented social networking services (e.g., web sites). Specifically, users of the social networking service establish a stored profile or identity within the social networking service. Users can associate, or link, their respective profiles with other users, upon approval of such other users, to establish an electronic relationship between users such that a user can follow, subscribe to, or otherwise receive content generated by another user. Accordingly, a set of online relationships between users, such as provided by one or more social networking services, can include explicitly-defined relationships and relationships implied by social connections with other online users, where the relationships form a social graph.

The social graph is provided to identify relationships between users of the social networking service and can identify a strength of the relationships. A relationship between users can be created when, among other instances: (i) a user agrees to follow another user, (ii) a user comments on another user's post, (iii) users of the social networking service are identified in another data set that is stored for the user (e.g., an address book for the user that the messaging service can access, or that the user provides to the messaging service), (iv) the users are both identified as depicted in a photograph, (v) the users are identified as being geographically near each other at a particular time (e.g., mobile telephones of each user are located together at multiple different times), (vi) the users email or chat with each other frequently, and (vi) the users interact on third party websites. A distance between two users can be determined based on a number of individuals that are necessary to connect the two users, and a strength of each relationship in a chain of the connecting relationships.

The social graph may be a data structure that identifies, for a plurality of users that can transmit and receive posts, an acquaintance relationship of the users in the plurality to each other. The social graph may identify, for each acquaintance relationship, a strength of the acquaintance relationship. The distance may be based on (i) a minimum number of acquaintance relationships to connect a first user and a second user, and (ii) a strength of the connecting relationships.

FIG. 1 is a diagram of an example network architecture 100. The network architecture 100 includes computing devices 102, 104, 106, 108, 110 that can each communicate with a first server system 112 and/or a second server system 114 over a network 111. A user 122, 124, 126, 128, 130 can be respectively associated with each of the computing devices 102, 104, 106, 108, 110. The network 111 can include a large computer network, such as a local area network (LAN), wide area network (WAN), the Internet, a cellular network, or a combination thereof connecting any number of mobile computing devices, fixed computing devices, and server systems. Each of the first and second server systems 112, 114 are implemented using one or more computing devices 116 in one or more locations, and one or more machine-readable repositories, or databases 118.

The computing devices 102-110 enable the respective users 122-130 to access and view documents such as web pages of web sites. The computing devices 102-110 also enable the respective users 122-130 to use one or more social networking applications that can be implemented over the network architecture 100. For example, the user 122 of computing device 102 can view a web page associated with a social networking application using a browser running on the computing device 102. The web page can be provided to the computing device(s) 102-110 by the server system 112. As discussed in further detail below, the computing devices 102-110 enable the respective users 122-130 to, among other actions, publish posts to social networking websites, to comment on posts of other users of the social networking application, to follow other users of the social networking application and/or to annotate displayed documents (e.g., a web page).

In the example architecture 100, the computing devices 102, 104, 106 are illustrated as desktop-type computing devices, the computing device 108 is illustrated as a laptop-type computing device 108 and the computing device 110 is illustrated as a mobile computing device. However, the computing devices 102-110 can each include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

Figure 2:
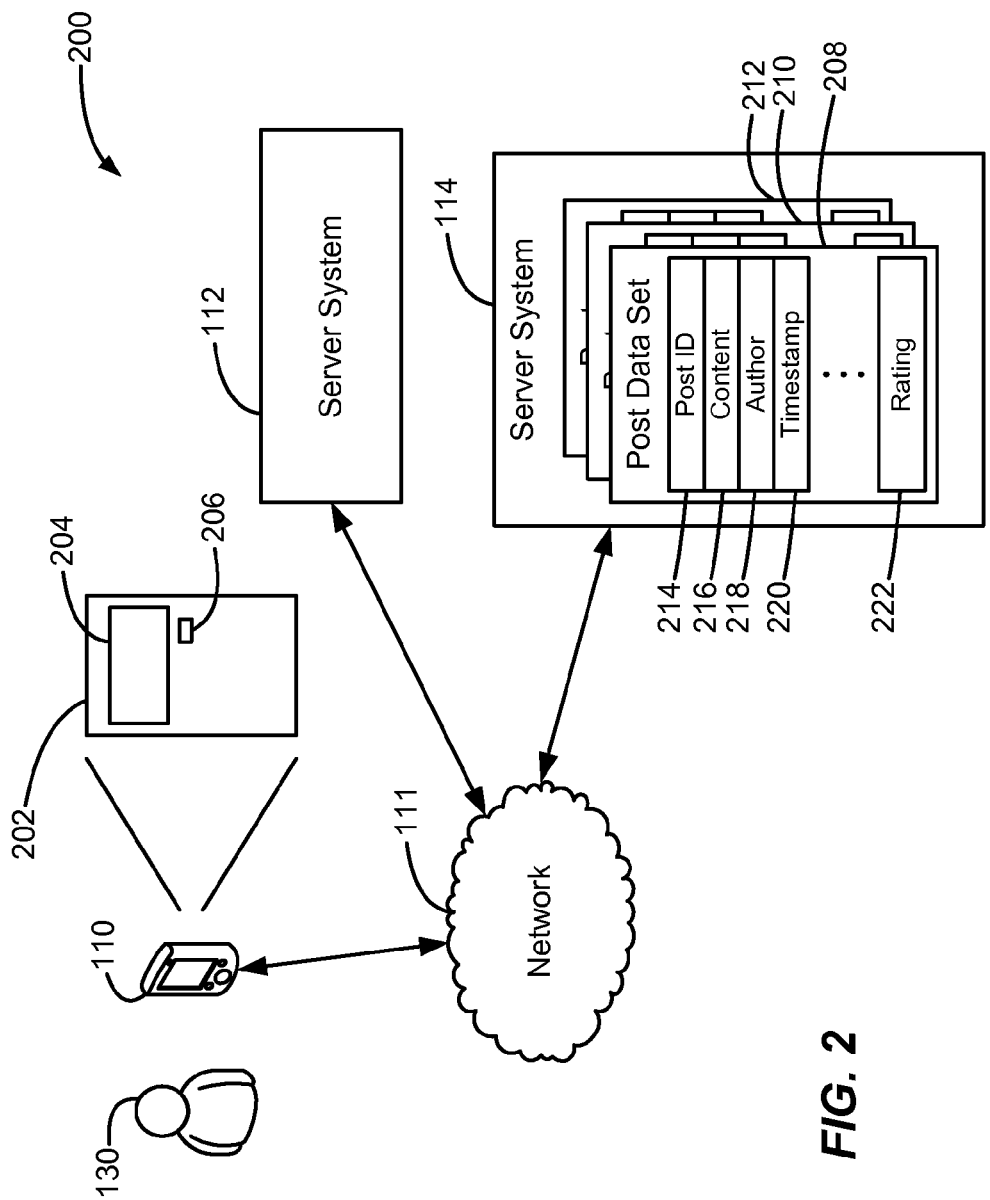
FIG. 2 is a diagram of a portion of the example network architecture of FIG. 1.

FIG. 2 is a diagram of a portion 200 of the example network architecture of FIG. 1. In FIG. 2, the computing device 110 communicates with the server system 114 to display a social networking portal 202 on the computing device. Specifically, the server system 114 is associated with a social networking service that enables users of the social networking service to post comments regarding various topics. For example, the user 130 can input text into a dialogue box 204 displayed in the portal 202 and can submit the text to the server system 114 by selecting a "Submit" button 206. The server system 114 receives the text and generates a corresponding post data set, discussed below. The post data set can be distributed to other users of the social networking service, and a corresponding post can be displayed to such other users.

The server system 114 stores post data sets 208, 210, 212, each having an associated post identifier (Post ID). The posts 208, 210, 212 can each correspond to different authors or the same author (e.g., one or more of the users 124-130). In some implementations, each post data set 208-212 includes post identification data 214 (e.g., Post ID), content data 216, author data 218 and timestamp data 220. For example, the post identification data 214 is a unique number assigned to the post data set, the content data 216 is the content (i.e., post text) input by an author, the author data 218 identifies the author of the content, and the timestamp data 220 indicates the date and time that the post was submitted by the author. In some implementations, the data of each data set further includes rating data 222 and/or other data. The rating data 222 can include a rating associated with the author of the post and/or a rating associated with the post itself. For example, users that view a post submitted by an author can submit an author rating corresponding to the user's perceived quality of the author, and/or can submit a post rating corresponding to the user's perceived quality of the post. Aggregate ratings (e.g., an average rating) can be maintained for each of the author rating and the post rating. In some implementations, the rating of a particular author can be determined based on a number of "followers" the author has.

The other data can include a number of posts submitted by the particular author and/or details regarding a social network of the author (e.g., the number of followers the author has in a particular social network). In some implementations, the other data can include geo-coding data (e.g., a location associated with the author when the content was input) and/or whether the post submitted by the author is a re-post of an earlier post submitted by a different author.

In an example implementation, one or more posts to a social networking application can be used to annotate a resource, such as a web page. In such implementations, the post data sets can be processed (e.g., using the server system 114) to generate corresponding annotation data sets for annotating a resource. In this manner, and as discussed in further detail herein, posts submitted through a social networking application can be provided as annotations to a resource.

By way of non-limiting example, the server system 114 can process the post data sets in various manners to generate corresponding annotation data sets. For example, the server system 114 can review the content data 216 of each post data set to determine whether a resource identifier (e.g., URI) is present in the content data. If the content data 216 includes a resource identifier, an annotation data set can be generated based on the particular post data set. As an illustration, an author may generate a post urging her social networking contacts to "Check out www.website.com, this site has great shopping deals!" When the server system 114 reviews the post data set corresponding to this example post, the server system 114 recognizes the URL "www.website.com" in the content data. Consequently, the server system 114 generates an annotation data set based on the corresponding post data set, whereby the URL is provided in resource identification data of a corresponding annotation data set.

As another example, the content data of a post data set can include a shortened resource identifier (e.g., a shortened URL). For example, a URL shortening service may have been used by the post author to generate a shortened URL that points to resource identifier of a particular resource. If the content data 216 includes a shortened URL, the server system 114 can follow the shortened URL to determine the URL that is directly associated with the particular resource. Consequently, the server system 114 generates an annotation data set based on the corresponding post data set, whereby the URL directly associated with the particular resource, as opposed to the shortened URL present in the content data, is provided in the resource identification data of the annotation data set.

As another example, the server system 114 can also review the context of the content data to determine whether a corresponding annotation data set should be generated. In some cases, the context of the content data can be directed to one or more resources. As an illustration of this, an author may generate a post urging his social networking contacts to "Check out News Network's sports page on their website. This page has the most current college team rankings." When the server system 114 reviews the post data set corresponding to this example post, the server system 114 recognizes that the context of the content data relates to the website for "News Network," and that the content data relates to the sports page of the News Network website in particular. Consequently, the server system 114 can generate one or more annotation data sets based on the corresponding post data set. Using the above example, a first annotation data set can be generated, in which the resource identification data is provided as the URL corresponding to the home page of the News Network website. A second annotation data set can be generated, in which the resource identification data is provided as the URL corresponding to the sports page of the News Network website.

The server system 114 can generate an annotation data set based on a post data set in various manners. In some implementations, the server system 114 copies the data from the post data set to corresponding data in the annotation data set. For example, the content data 216 of the post data set is copied to content data of the corresponding annotation data set. The author data 218 of the post data set is copied to author data of the annotation data set, and the timestamp data 220 of the post data set is copied to timestamp data of the annotation data set. The rating and/or other data can be similarly copied.

The resource identification data of the annotation data set can include a Resource ID determined by the server system 114 based on the content data 216 of the post content data set. For example, and as discussed above, if the content data explicitly states a Resource ID (e.g., URL), the resource identification data of the annotation data set can include the particular Resource ID. If the content data provides a shortened Resource ID, the server system 114 can follow the shortened Resource ID to determine the full Resource ID that is directly associated with the particular resource. The resource identification data of the annotation data set can include the full Resource ID. If one or more Resource IDs are derived from the context of the content data 216, as discussed above, the resource identification data of respective annotation data sets can include a Resource ID of the one or more Resource IDs.

In some implementations, a post data set can be generated based on a re-post by one author of a previously submitted post by another author. For example, a first user of a social networking service can author and submit a first post that is presented to other users of the social networking service. Another, second user of the social networking service can author and submit a second post that is a re-post of the first post (e.g., the second post includes the content of the original first post, and identifies the first author). The second post can is submitted and presented to other users of the social networking service. In such an instant, the post data set can include data indicating whether the underlying post is an original post or a re-post of an original post.

With continued reference to FIG. 2, the post data sets, or at least the content data of the post data sets, can be provided from the server system 114 to the server system 112 over the network 111. The server system 112 can process each of the post data sets to determine a natural language that the particular post was written in. For example, the server system 112 can process the content data to analyze the text and identify the language that the post was written in based thereon. In some implementations, the server system 112 analyzes a large corpus of text in known languages and trains a machine learning model to determine which of the known languages the text corresponds to. In some implementations, any of a variety of machine-learning algorithms can be used (e.g., Bayes classifiers, or support vector machines).

In some cases, the content data may be insufficient for the server system 112 to process and determine the language. For example, the post can include one or more short text fragments that are insufficient for accurately determining the language that they were written in. In some social networking applications, for example, the length of a post is limited to a threshold number of characters (e.g., 140 characters). This relatively low number of characters may be insufficient for the server system 112 to accurately determine the natural language that the post was written in. Further, many users of social networking applications tend to include abbreviations and/or incorrect grammar structures in their posts. For example, a user may post "will c u l8r 2night" instead of "I will see you later tonight." Such abbreviations and incorrect grammar structure enable users to quickly enter post text and/or maximize character space (e.g., when limited to a threshold number of characters). Such abbreviations and incorrect grammar structure, however, compound the difficulty in determining the natural language that the post was written in.

Implementations of the present specification enable the natural language that a post was written in to be determined based on one or more social graphs associated with the author of the post. Generally, for situations in which the systems discussed here collect personal information about users the users may be provided with an opportunity to opt in/out of programs or features that may collect personal information (e.g., information about a user's preferences, information relating to the user's social graph, or a user's contributions to social content providers). In addition, certain data may be anonymized in one or more ways before it is stored or used, so that personally identifiable information is removed. For example, a user's identity may be anonymized so that identified user preferences or user interactions are generalized (for example, generalized based on user demographics) rather than associated with a particular user.

For example, in some implementations, a user can opt into or opt out of natural language detection based on one or more social graphs associated with the user. For example, a user authoring a post may opt into or out of the use of their social graphs for natural language detection. As another example, a non-author user may opt into or out of the use of their social graph for natural language detection of a post authored by another user. In some implementations, social graph information used for natural language detection is anonymized.

Figure 3A:
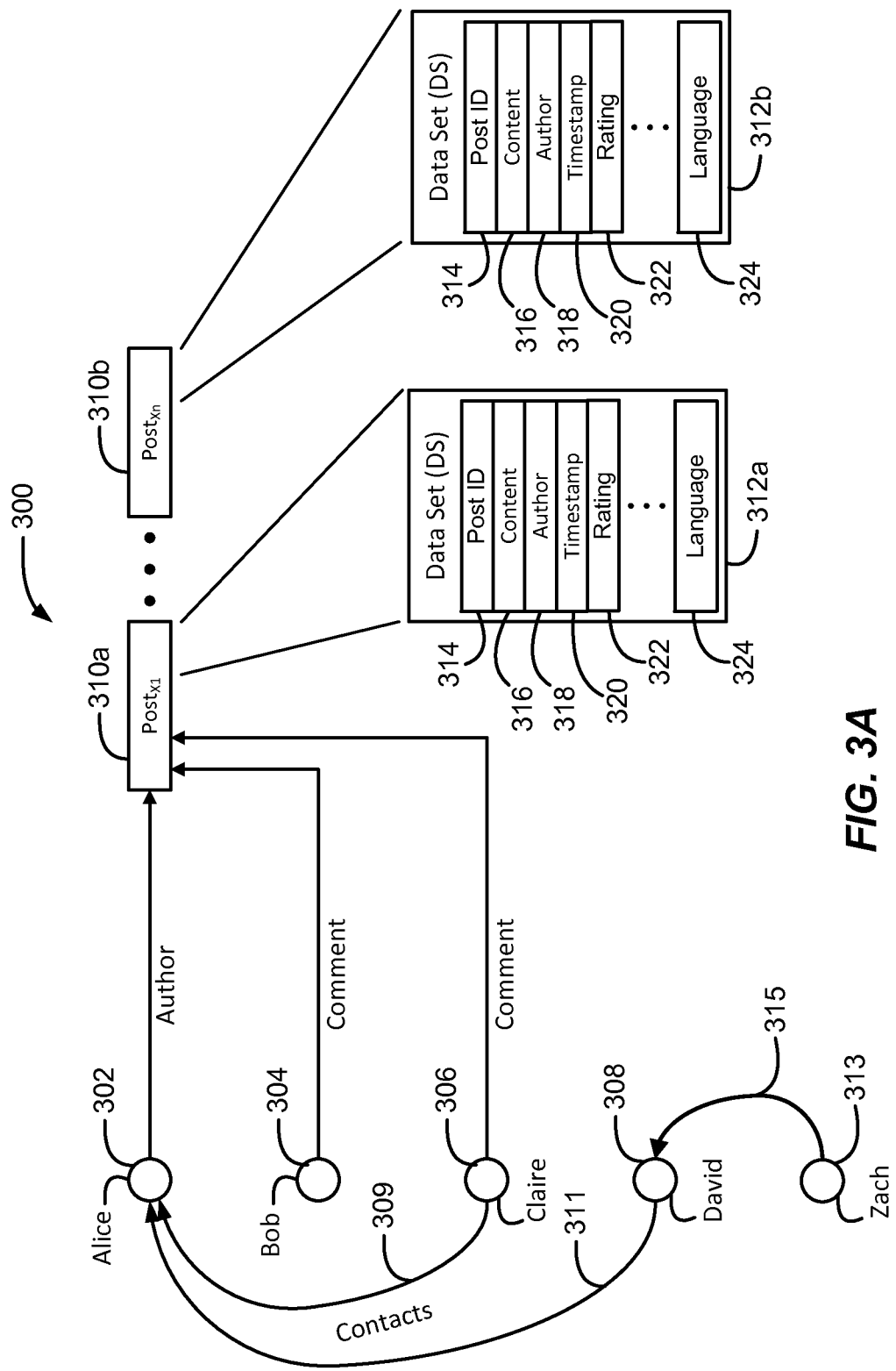
FIG. 3A is a diagram of an example first social network of a user.

FIG. 3A is a diagram of an example first social graph 300 of a user ("Alice") identified using a node 302. The first social graph 300 can be determined based on Alice's use of a first computer-implemented social service (e.g., service that can include services/functionalities such as, for example, ability to form social networking/connections between members/users, email, messaging, chat, micro-blogging, sharing content, generating social content, etc.). In this example, the first social graph is determined based on the use of social networking service (X). For example, Alice can generate a profile within the first social networking service and can digitally associate the profile with profiles of other users of the first social networking service, and author posts that can be published using the first social networking service. In the example first social graph 300 of FIG. 3A, other users of the first social networking service include user ("Bob") identified by a node 304, user ("Claire") identified by a node 306, user ("David") identified by a node 308, and user ("Zach") identified by a node 313. Claire and David are both contacts of Alice within the first social networking service (X), as indicated by edges 309, 311. For example, Alice previously approved Claire and David as contacts in the first social networking service (X), such that information and/or posts provided or authored by Alice may be automatically shared with Claire and David.

In the example first social graph 300 of FIG. 3A, Bob is not a contact of Alice within the first social networking service (X). Instead, Bob may be another user of the first social networking service (X) that has limited access to the information and/or posts provided by Alice. Zach is a contact of David, as indicated by the edge 315, but is not a contact of Alice.

In the example first social graph of FIG. 3A, Alice is indicated as the author of one or more posts 310a, 310b ($Post_{X1}$-$Post_{Xn}$) within the first social networking service (X). Each post 310a, 310b includes a corresponding post data set 312a, 312b. Each post data set 312a, 312b includes post identification data 314 (e.g., Post ID), content data 316, author data 318, timestamp data 320, rating data 322 and/or other data, discussed in detail above. Each post data set 310a, 310b can also include language data 324 that indicates the natural language that the post was written in. The language data 324 can be determined based on implementations of the present specification, as discussed herein.

In the example first social graph 300 of FIG. 3A, both Bob and Claire are illustrated as having commented on the post 310a ($Post_{X1}$) of Alice. In some implementations, the post 310a may include a privacy setting that enables any user of the first social networking service (X) to view and comment on the post 310a. In this manner, both Bob, who is not a contact of Alice, and Claire, who is a contact of Alice, are able to view and comment on the post 310a. In some implementations, Alice is able to establish a privacy setting of a post such that only contacts of Alice within the first social networking service (X), or a subset of contacts of Alice within the first social networking service (X) are able to view and comment on the post.

Figure 3B:
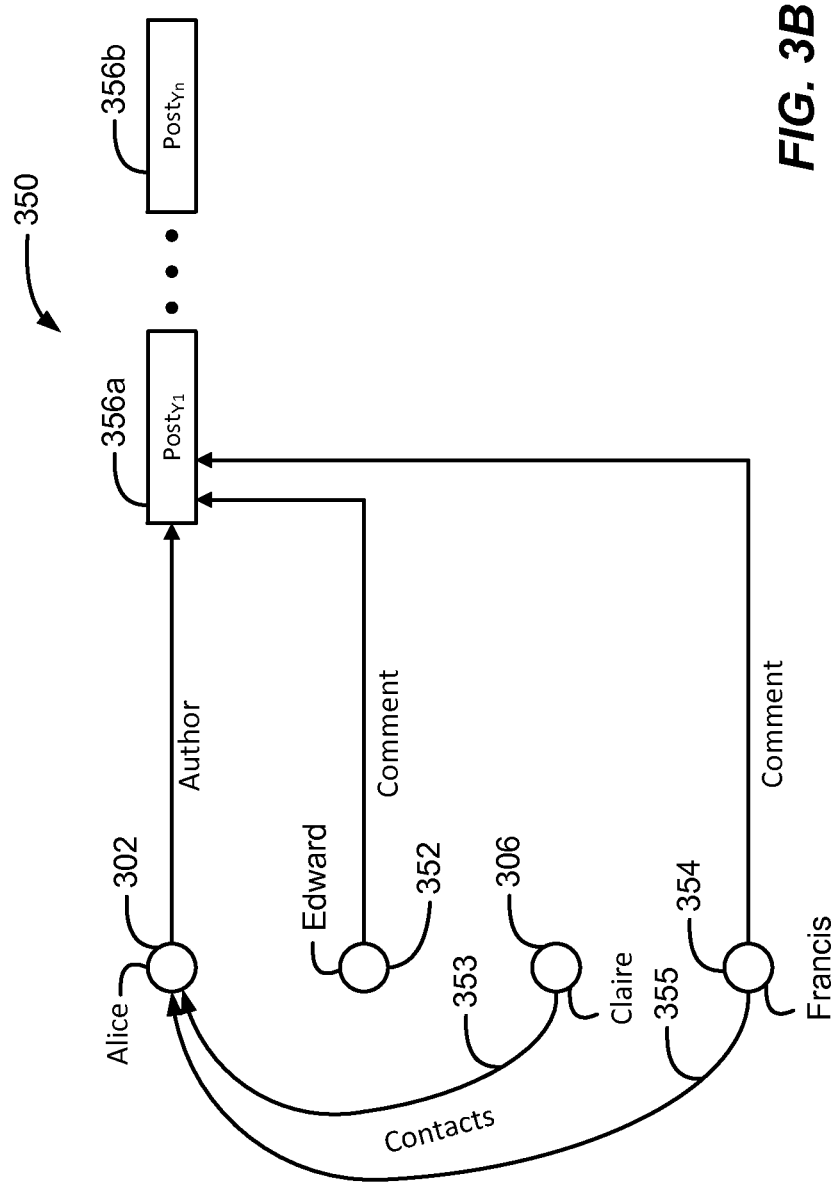
FIG. 3B is a diagram of an example second social network of the user of FIG. 3.

FIG. 3B is a diagram of an example second social graph 350 of the user ("Alice") identified by the node 302 of FIG. 3A. The second social graph 350 can be determined based on Alice's use of another social service (e.g., service that can include services/functionalities such as, for example, ability to form social networking/connections between members/users, email, messaging, chat, micro-blogging, sharing content, generating social content, etc). In this example, the second social graph is determined based on the use of second computer-implemented social networking service (Y). For example, Alice can generate a profile within the second social networking service and can digitally associate the profile with profiles of other users of the second social networking service, and author posts that can be published using the second social networking service. In the example second social graph 350 of FIG. 3B, other users of the second social networking service include user ("Claire") identified by the node 306, user ("Edward") identified by the node 352 and user ("Fred") identified by the node 354. Claire and Fred are both contacts of Alice in the second social networking service (Y), as identified by the edges 353, 355. For example, Alice previously approved Claire and Fred as contacts in the second social networking service, such that information and/or posts provided or authored by Alice may be automatically shared with Claire and Fred. As provided in FIG. 3A, Claire is also a contact of Alice in the first social networking service (X). In the example second social graph 350 of FIG. 3B, Edward is not a contact of Alice within the second social networking service (Y). Instead, Edward may be another user of the second social networking service (Y) that has limited access to the information and/or posts provided by Alice.

In the example second social graph of FIG. 3B, Alice is indicated as the author of one or more posts 356a, 356b ($Post_{Y1}$-$Post_{Yn}$) within the second social networking service (Y). Each post 356a, 356b includes a corresponding post data set (not shown), as discussed above with respect to FIGS. 2 and 3A.

As noted above, the example first social graph 300 of FIG. 3A corresponds to a social network of Alice within a computer-implemented first social networking service (X), and the example second social graph 350 of FIG. 3B corresponds to a social network of Alice within a computer-implemented second social networking service (Y). As discussed in detail below, a language of a post authored by Alice may be determined based on one or more social graphs associated with Alice. In some implementations, information associated with the first social graph 300 and/or information associated with the second social graph 350 can be processed to determine the natural language of a newly generated post authored by Alice. In some implementations, the first social graph 300 and the second social graph 350, having Alice as a user common to both, can be provided as a composite social graph.

By way of non-limiting example, a user (e.g., Alice) of a social networking service (e.g., first social networking service (X), second social networking service (Y)) can generate a post that is published to the social networking service. In response to the user submitting the post content, a computing device (e.g., server system 114) generates a corresponding post data set. The server system can publish the post to the social networking service based on settings (e.g., privacy settings) established by the user. For example, the user may provide that every other user of the social networking service may view and/or comment on the post (e.g., the privacy setting is provided as "public"). As another example, the user may provide that only the user's contacts, or followers, within the social networking service may view and/or comment on the post (e.g., the privacy setting is provided as "private").

A social graph, such as the example social graphs illustrated in FIGS. 3A and 3B, includes a social "distance" between a user (e.g., Alice) and other users of the social networking service (e.g., Bob, Claire, David, Edward, Francis and Zach). Each of the nodes (e.g., nodes 302, 304, 306, 308 of FIG. 3A) in a social graph identifies a user of the social networking service and each edge (e.g., edges 309, 311, 315 of FIG. 3A) between the nodes represents a relationship between the users. Each relationship may be accompanied by a number that identifies a strength of the relationship.

As an illustration, node 302 ("Alice") is identified as directly related to nodes 306 ("Claire") and 308 ("David"). Thus, Claire and David are identified as friends or acquaintances of Alice and the edges 309 and 311 represent acquaintance relationships. An acquaintance relationship can be formed, for example, when: (i) either of the users requested to subscribe to the another user of a micro-blogging service, (ii) the other user acknowledged the request, (iii) a user has commented on a post by another user of the micro-blogging service, or (iv) one of the users is in an address book stored for the other user (e.g., Alice's messaging system may have an address book that is independent of Alice's subscriptions, but identifies individuals that Alice has emailed or has stored as contacts of interest). Thus, several mechanism may exist for generating an acquaintance relationship between users.

A strength of an acquaintance relationship may depend on the mechanism for generating the acquaintance relationship or a subsequent frequency and type of contact between the users. For example, a relationship where both users subscribed to each other may be stronger than a relationship where only one of the users subscribes to the other user. A relationship where one of the users subscribes to the other user may be stronger than a relationship where the one user includes the other user in an address book of contacts, but does not subscribe to the other user. A relationship where a user includes an address of the user in a contact book, may be stronger than a relationship where a user once emailed another user but did not add that other user to his address book. A relationship where a user commented a single time on a post of another user, but did not subscribe to the other user, may be stronger than a relationship where the user emailed the other user a single time.

In some implementations, a strength of acquaintance relationship may depend on a frequency of contact between the users. For example, a frequency of contact can depend on how often a user emails another user, comments on the other user's posts, likes the other user's posts, or replies to the other user's posts. The relationship may be stronger if both users interact with each other than if the interaction is only in one direction. The strength of contact may depend on how recent the contact was. For example, Bob commenting on Alice's post 310a may provide less of an impact on a strength of Bob and Alice's relationship than Claire commenting on Alice's post 310a, because Claire is a contact of Alice.

A distance between two users may not depend only on whether the users are acquaintances and a strength of the relationship, the distance can depend on how many edges it takes to reach the other user. For example, Claire and David may be considered "first-order" acquaintances of Alice. "Second-order" acquaintances can include all acquaintances of the first-order acquaintances. For example, because David is an acquaintance of Alice, and because Zach is an acquaintance of David, Zach may be Alice's second-order acquaintance. Third-order acquaintances may be determined similarly, as well as any n-th order acquaintance.

A distance may be a simple determination of the order of the acquaintance. For example, a first-order acquaintance may have a distance of 1, a second-order acquaintance may have a distance of 3, and a third-order acquaintance may have a distance of 9. Conversely, the distance may represent a decreasing value as the distance increases (e.g., 1, 0.33, and 0.11).

In some implementations, a distance value between two users may account for a strength of the relationships, in addition to a number of relationships connecting the users. As an illustration, the distance between Alice and Claire, and Alice and Zach may be computed. Although numerous mechanisms for weighting distance are contemplated, in this illustration the example strength number and a representation of the number of relationships are simply multiplied. A distance between Alice and Zach is calculated as:

$$(a)(b)+(c)(d)$$

where a is a numerical representation of the first-order relationship (e.g., 1), b is an example first-order strength (e.g., 27), c is a numerical representation of the second-order relationship (e.g., 0.33), and d is an example second-order strength (e.g., 328). Based on the above-provided example values, the distance between Alice and Zach is equal to 166 (i.e., (1)(27)+(0.33)(328)=135.24). A distance between Alice and the Claire is calculated as:

$$(a)(b)$$

and is equal to 27, using the above-provided, example values. Accordingly, the distance between Alice and Claire (i.e., 27) is shorter than the distance between Alice and Zach (i.e., 135.24). Consequently, the relationship between Alice and Claire is deemed to be stronger than the relationship between Alice and Zach.

Initially, the language that the post is written in may be unknown. In accordance with implementations of the present specification, information (electronically stored data) corresponding to one or more social graphs associated with the user may be accessed and processed to determine the natural language that the post is written in. By way of non-limiting example, information corresponding to one or more social graphs associated with the user can include distances between the user that authored the particular post and other users within the social networking service, statistics regarding previous posts authored by the user, statistics regarding previous posts authored by contacts of the user within the one or more social networking services, and statistics regarding comments authored by non-contact commentators, i.e., commentators who are not contacts of the user, who are also users of the one or more social networking services. In some implementations, combinations of this information can be used to determine the natural language that the post was written in. In some implementations, the distances between the user that authored the particular post and other users within the social networking service may be used to weight one or more of the statistics.

In some implementations, information associated with one or more social graphs associated with the user includes statistics regarding previous posts authored by the user. Example statistics can include respective percentages of one or more natural languages that previous posts authored by the user are written in. In some implementations, if a majority (i.e., greater than 50%) of the user's previous posts are written in a particular natural language, the newly authored post is assumed to also be written in the particular natural language.

By way of non-limiting example, and referring again to FIG. 3A, the language data of Alice's previous posts associated with the first social graph 300 (i.e., $Post_{X1}$-$Post_{Xn}$) may indicate that 100% of Alice's previous posts are written in English. Consequently, the language of the newly authored post can be determined to be written in English. By way of another non-limiting example, and referring again to FIG. 3A, the language data of Alice's previous posts (i.e., $Post_{X1}$-$Post_{Xn}$) may indicate that 70% of Alice's previous posts are written in English and 30% of Alice's previous posts are written in Spanish. Consequently, the language of the newly authored post can be determined to be written in English.

The newly authored post can be assumed to be written in the natural language corresponding to the highest percentage of the user's previous posts. By way of non-limiting example, the language data of Alice's previous posts within the one or more of the first social networking service (X) and the second social networking service (Y) may indicate that 40% of Alice's previous posts are written in English, 35% of Alice's previous posts are written in Spanish, and 25% of Alice's previous posts are written in German. Consequently, the language of the newly authored post can be determined to be English.

By way of another non-limiting example, and referring again to FIGS. 3A and 3B, the language data of Alice's previous posts within the first social networking service (X) (i.e., $Post_{X1}$-$Post_{Xn}$) may indicate that 35% of Alice's previous posts are written in English, 35% of Alice's previous posts are written in Spanish, and 30% of Alice's previous posts are written in German. In such an example instance, there is not a clear majority and there is not a highest percentage to identify a particular natural language that the newly generated post may have been authored in. Consequently, additional social graph information can be accessed to determine the natural language that the newly authored post was written in. For example, the language data of Alice's previous posts associated with the second social graph 350 (i.e., $Post_{Y1}$-$Post_{Yn}$) can be used.

By way of non-limiting example, the language data of Alice's previous posts within the second social networking service (Y) (i.e., $Post_{Y1}$-$Post_{Yn}$) may indicate that 60% of Alice's previous posts are written in English, 20% of Alice's previous posts are written in Spanish, and 20% of Alice's previous posts are written in German. Consequently, the language of the newly authored post can be determined to be written in English. By way of another non-limiting example, language data statistics from the first social graph 300 and the second social graph 350 can be combined. For example, the language data of Alice's previous posts within both the first social networking service (X) and the second social networking service (Y) may indicate that 50% of Alice's previous posts are written in English, 30% of Alice's previous posts are written in Spanish, and 20% of Alice's previous posts are written in German. Consequently, the language of the newly authored post can be determined to be English.

Information associated with one or more social graphs associated with the user can include statistics regarding contacts within the corresponding one or more social networking services. Example statistics can include respective percentages of one or more natural languages that previous posts authored by contacts of the users are written in. In some implementations, if a majority (i.e., greater than 50%) of the user's contacts publish posts in a particular natural language, the newly authored post of the user is assumed to also be written in the particular natural language.

By way of non-limiting example, and referring again to FIG. 3A, the language data of Claire's previous posts and/or David's previous posts within the first social networking service (X) may indicate that 100% of the collective posts are written in English. Consequently, the language of the new post authored by Alice can be determined to be written in English. By way of another non-limiting example, and referring again to FIG. 3A, the language data of Claire's previous posts and/or David's previous posts within the first social networking service (X) may indicate that 70% of the collective posts are written in English and 30% of the collective posts are written in Spanish. Consequently, the language of the newly authored post can be determined to be written in English.

In some implementations, the newly authored post is assumed to be written in the natural language corresponding to the highest percentage of the collective posts of one or more of the user's contacts within the corresponding one or more social networking services. By way of non-limiting example, the language data of Claire's previous posts and/or David's previous posts within the one or more of the first social networking service (X) may indicate that 40% of the collective posts are written in English, 35% of the collective posts are written in Spanish, and 25% of the collective posts are written in German. Consequently, the language of the new post authored by Alice can be determined to be English.

By way of another non-limiting example, and referring again to FIGS. 3A and 3B, the language data of Claire's previous posts and/or David's previous posts within the first social networking service (X) may indicate that 35% of the collective posts are written in English, 35% of the collective posts are written in Spanish, and 30% of the collective posts are written in German. In such an example instance, there is not a clear majority and there is not a highest percentage to identify a particular natural language that the newly generated post may have been authored in. Consequently, additional social graph information can be accessed to determine the natural language that the newly authored post was written in. For example, the language data of Claire's previous posts and/or Francis' previous posts within the second social networking service (Y) can be used.

By way of non-limiting example, the language data of Claire's previous posts and/or Francis' previous posts within the second social networking service (Y) may indicate that 60% of the collective posts are written in English, 20% of the collective posts are written in Spanish, and 20% of the collective posts are written in German. Consequently, the language of the new post authored by Alice can be determined to be written in English. By way of another non-limiting example, language data statistics from the first social graph 300 and the second social graph 350 can be combined. For example, the language data of Claire's previous posts and/or David's previous posts within the first social networking service (X) as well as the language data of Claire's previous posts and/or Francis' previous posts within the second social networking service (Y) may indicate that 50% of the collective posts are written in English, 30% of the collective posts are written in Spanish, and 20% of the collective posts are written in German. Consequently, the language of the new post authored by Alice can be determined to be English.

Information from one or more social graphs associated with the user can include statistics regarding non-contact commentators within the corresponding one or more social networking services. Example statistics can include respective percentages of one or more natural languages corresponding to previous comments authored by non-contact users within one or more social networking services. For example, and with reference to FIGS. 3A and 3B, both Bob and Edward are non-contact commentators. That is, although Bob is not a contact of Alice in the first social networking service (X), Bob has commented on the post 310a (Post$_{X1}$) authored by Alice. Although Edward is not a contact of Alice in the second social networking service (Y), Edward has commented on the post 356a (Post$_{Y1}$) authored by Alice. In some implementations, if a majority (i.e., greater than 50%) of the non-contact commentator's comments are in a particular natural language, the newly authored post of the user is assumed to also be written in the particular natural language. In some implementations, the newly authored post is assumed to be written in the natural language corresponding to the highest percentage of the collective comments of one or more non-contact commentators within the corresponding one or more social networking services.

The distances between the user that authored the particular post and other users within the social networking service may be used to weight one or more of the statistics. For example, one or more of the above-discussed statistics can be combined to provide aggregate statistics. Each of the one or more statistics can be weighted based on corresponding distance between the user that authored the subject post and a user corresponding to a particular statistic. By way of non-limiting example, and with reference to FIG. 3A, a first set of statistics can correspond to percentages of posts written by Claire in various languages (e.g., 70% English, 30% Spanish), and a second set of statistics can correspond to percentages of posts written by Zach in various languages (e.g., 70% Spanish, 30% English). Without weighting, aggregate statistics based on the posts of Claire and Zach may indicate, for example, that 50% of posts are written in English and 50% are written in Spanish.

Because Claire has a stronger relationship to Alice than Zach, as indicated by respective distances, the distances can be used to weight the first set of statistics and the second set of statistics. In this manner, the statistics relating to a user having a stronger relationship to the user that authored the subject post are considered more heavily when determining the aggregate statistics. For example, the distance between Alice and Claire may be determined to be a first value (e.g., 27), and the distance between Alice and Zach may be determined to be a second value (e.g., 135.24). Consequently, the distance between Alice and Claire is less than the distance between Alice and Zach, indicating a closer relationship between Alice and Claire. The first value can be applied to the first set of statistics and the second value can be applied to the second set of statistics to respectively weight the first and second sets of statistics in calculating the aggregate statistics. In some implementations, an inverse of the first value can be applied to the first set of statistics and an inverse of the second value can be applied to the second set of statistics. With weighting, aggregate statistics based on the posts of Claire and Zach may indicate, for example, that 60% of posts are written in English and 40% are written in Spanish.

The natural language determined based on the information associated with one or more social graphs may be provided as a preliminary language. For example, the language data of the corresponding post data set can be preliminarily set to the determined natural language and can be updated based on further analysis. The post data set, or at least the content data and the language data, can be provided to a server system (e.g., the server system 112), which can process the content data to determine the natural language that the post was written in. The language data, including the preliminarily language, can be provided as an input for processing of the content data.

The preliminary language can be used by the server system as an initial language for analyzing the content data. For example, the server system can process the content data based on an initial assumption that the content data is written in the preliminary language. The server system, for example, can identify one or more words within the content data and test each of the one or more words against a library of known words in the preliminary language. If one or more of the words identified from the content data corresponds to words found in the library, the server system can provide an output identifying the preliminary language as the actual language that the content data was written in. If one or more of the words identified from the content data do not correspond to words found in the library, the server system can provide an output identifying the preliminary language as an incorrect language, and can further process the content data to determine the actual language that the content data was written in.

Figure 4:
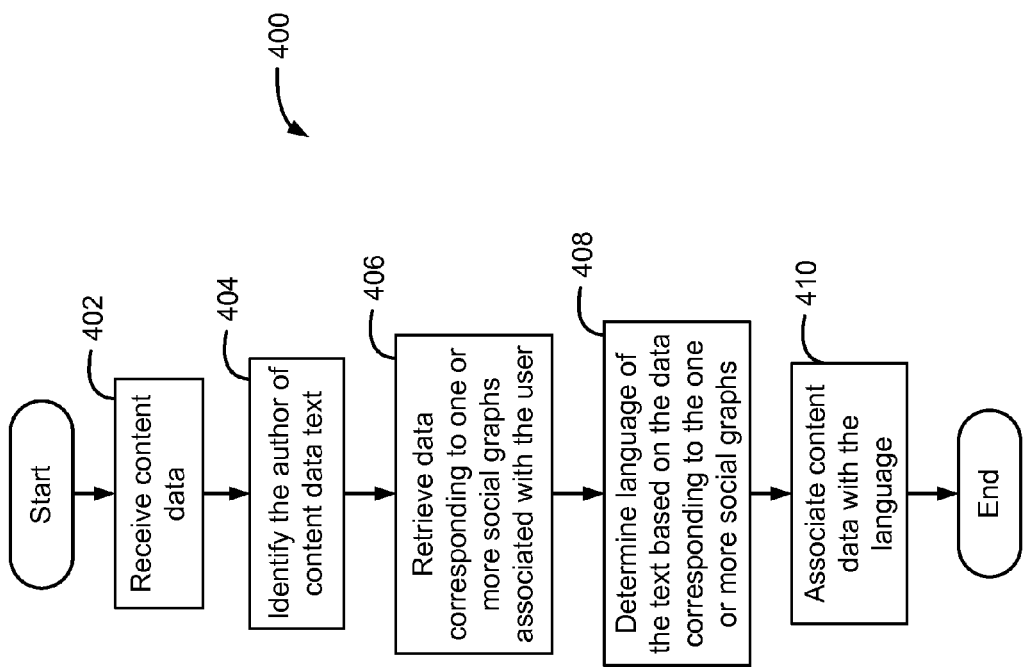
FIG. 4 is a flowchart illustrating an example process that can be executed in implementations of the present specification.

FIG. 4 is a flowchart illustrating an example process 400 that can be executed in implementations of the present specification. Content data is received (402), the content data including text. For example, the server system 114 can receive content data that is input by a user of a social networking service using a computing device (e.g., computing device 110). The content data can include text that is part of a post that the user publishes to the social networking service. The content data can be included as part of a post data set, as discussed in detail above. The author of the text is identified (404). For example, the server system 114 identifies the author of the text. In some implementations, the author includes the user of a social networking service that publishes a post to the social networking service. Author data can be included as part of a post data set, as discussed in detail above, and the author can be determined based on the author data.

Data corresponding to one or more social graphs associated with the user is retrieved (406). For example, the server system 114 can retrieve data corresponding to one or more social graphs associated with the user. The data can be stored in a computer-readable storage device. The data can include distances between the user that authored the text and other users within the social networking service, statistics regarding previous posts authored by the user, statistics regarding previous posts authored by contacts of the user within the one or more social networking services, and statistics regarding comments authored by non-contact commentators who are also users of the one or more social networking services. The data can include combinations of the above-described data, and can be used to determine the natural language that the post was written in. Distances between the user that authored the particular post and other users within the social networking service may be used to weight one or more of the statistics.

The language of the text is determined based on the data corresponding to the one or more social graphs (408). For example, the server system 114 determines the language of the text based on the data corresponding to the one or more social graphs. The language corresponds to a natural language that the text was written in. The content data is associated with the determined language (410). For example, the server system 114 associates the content data with the determined language. The content data can be included in a data set (e.g., post data set), and the content data is associated with the language by identifying the language in language data of the data set.

Publication of the one or more posts to one or more websites can be based on the language data of the post data sets. For example, a web browser can provide a frame to display one or more annotations to a displayed web page. The web browser can filter and/or sort to be displayed annotations based on language. For example, a user of the web browser can provide a user setting indicating that only English and Spanish language content should be displayed by the web browser, with English identified as a primary language and Spanish identified as a secondary language. As discussed above, posts in a social networking service can be provided as annotations to corresponding web pages. The posts can be filtered and/or sorted based on language before they are displayed. For example, posts that have been at least preliminarily identified to be written in English may be displayed first (e.g., when English is identified as the primary language), and posts that have been at least preliminarily identified to be written in Spanish may be displayed second (e.g., when Spanish is identified as the secondary language). Posts written in any other language (e.g., French, German, Chinese, Japanese) are not displayed as annotations to the web page. An example implementation corresponding to web page annotations is discussed in further detail below.

Figure 5A:
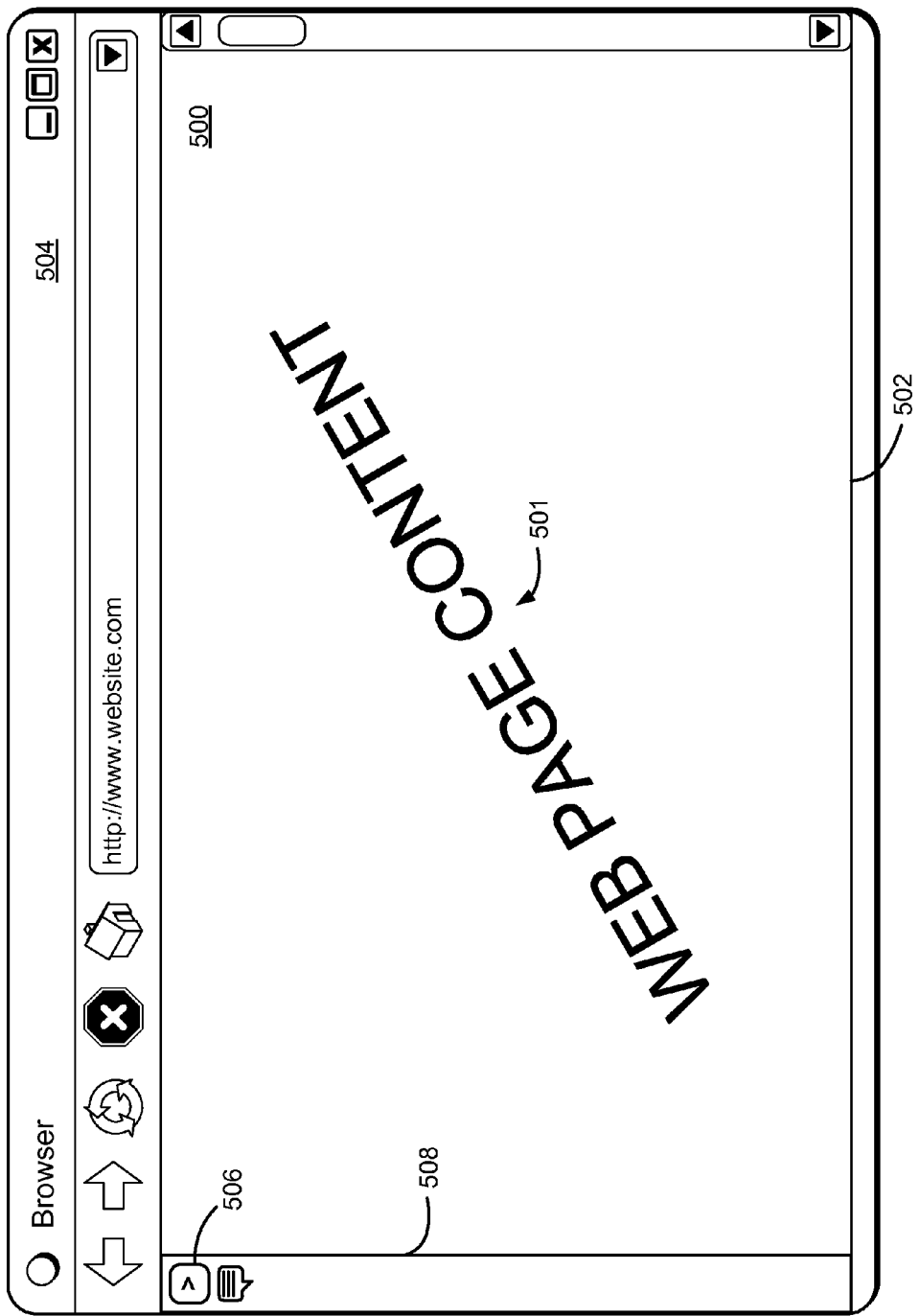
FIG. 5A depicts a screen-shot of an example web page.

FIG. 5A depicts a screen-shot of an example web page 500. The example web page 500 includes web page content 501 and is displayed within a frame 502 of a browser 504. An annotation display button 506 is provided in a vertical toolbar 508. A user viewing the web page 500 can click on the annotation display button 506, and/or can provide other input indicating that the user would like to see annotations relating to the web page.

Figure 5B:
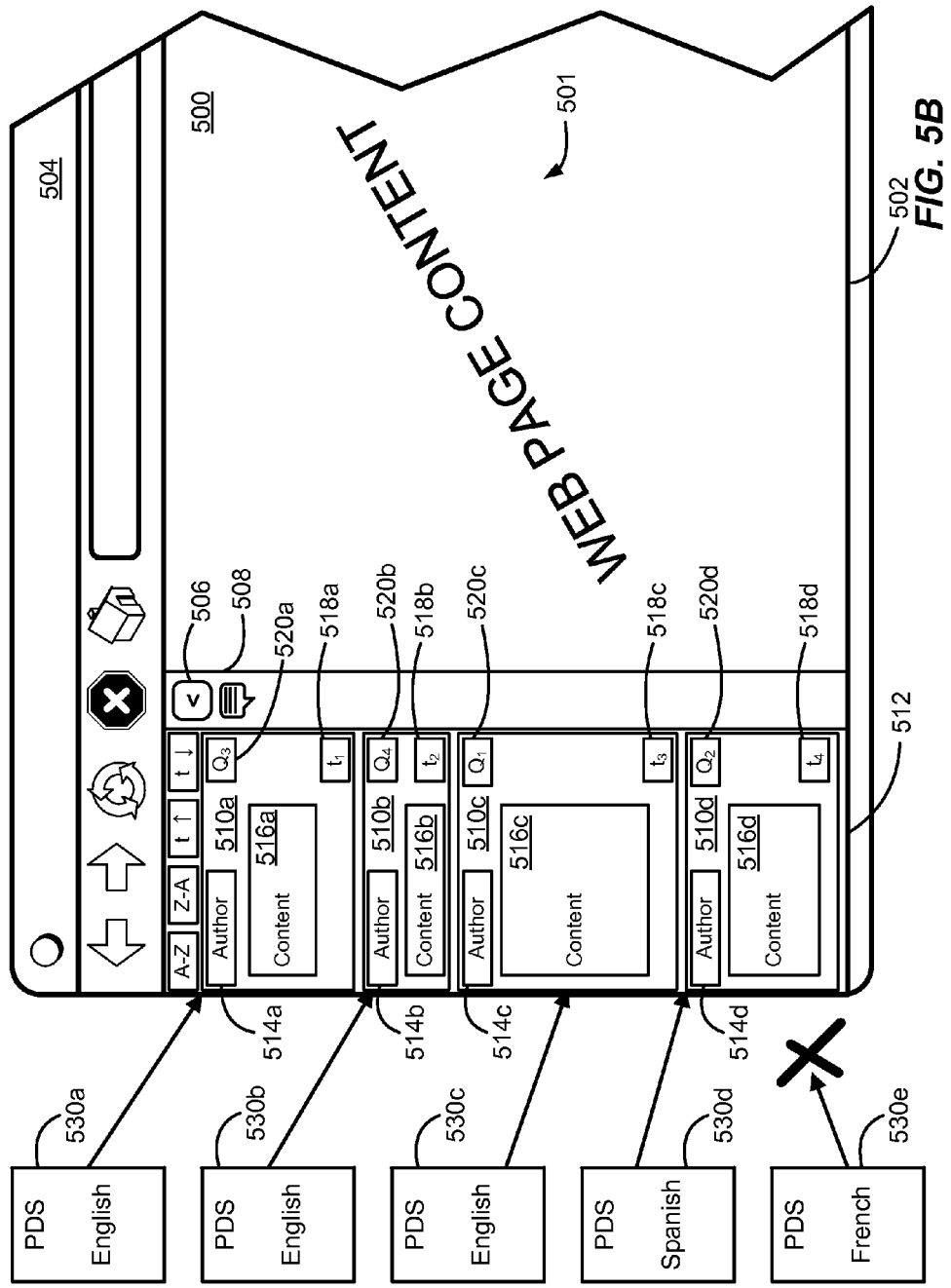
FIG. 5B depicts a screen-shot of the example web page including annotations displayed based on a language.

FIG. 5B depicts a screen-shot of the example web page 500 including annotations 510a-510d. More specifically, when a user viewing the web page 500 clicks on the annotation display button 506, and/or provides another input indicating that the user would like to see annotations relating to the web page, a second frame 512 is provided, within which the annotations 510a-510d are displayed. In the example of FIG. 5B, the annotations 510a-510 each include an author 514a-514d, respectively, content 516a-516d, respectively, a posting date 518a-518d, respectively, and a quality score 520a-520d, respectively. The annotations 510a-510d are representations of post data sets 530a-530d provided from a server system. The post data sets 510a-510c include content data that has been identified as having been written in English, and the post data set 530d includes content data that has been identified as having been written in Spanish. A post data set 530e may also be provided from the server system, and includes content data that has been identified as having been written in French. The annotations, however, do not include an annotation corresponding to the post data set 530e, as discussed in further detail below.

In the example illustration of FIG. 5B, the annotations 510a-510c correspond to posts published using a social networking service and written in a first language (e.g., English). The annotation 510d correspond to a post published using the social networking service and written in a second language (e.g., Spanish). In the example of FIG. 5B, the web browser settings indicate that only English and Spanish language text should be displayed, and provides English as the primary language and Spanish as the secondary language. For example, a user of the web browser may only understand English and Spanish and does not want the web browser to be cluttered with text written in a language that the user may not understand. Based on the web browser settings, the English-language annotations 510a-510c are displayed first, and the Spanish-language annotation 510d is displayed last. Because the post data set 530e is a French-language post data set, no corresponding annotation is displayed.

A number of implementations have been described. Nevertheless, it will be understood that various modifications may be made without departing from the spirit and scope of the specification. For example, various forms of the flows shown above may be used, with steps re-ordered, added, or removed. Accordingly, other implementations are within the scope of the following claims.

Implementations of the present specification and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present specification can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present specification have been described. Other implementations are within the scope of the following claims. For example, the actions recited in the claims can be performed in a different order and still achieve desirable results.

What is claimed is:

1. A system comprising:
one or more computers and one or more storage devices storing instructions that are operable, when executed by the one or more computers, to cause the one or more computers to perform operations comprising:
receiving content data, the content data comprising text;
responsive to determining that the content data is insufficient to accurately determine a natural language in which the text is written by determining that a number of characters of the text is less than a threshold number:
identifying an author of the text, the author being a first user of a social networking service;
retrieving social graph data corresponding to one or more social graphs associated with the first user, the social graph data being stored in a computer-readable storage device, the social graph data including a first set of language statistics and a second set of language statistics based on posts respectively authored by a second user and a third user that connect with the first user within the social networking service;
determining aggregate statistics from the first and second sets of language statistics based on a strength of relationship between the first and second users and a strength of relationship between the first and third users; and determining the natural language that the text is written in as one of a plurality of potential natural languages based on the aggregate statistics included in the social graph data corresponding to the one or more social graphs associated with the author.

2. The system of claim 1, wherein the social graph data comprises language statistics regarding posts that the first user has authored using the social networking service.

3. The system of claim 1, wherein the operations further comprise weighing the first and second sets of language statistics based on the strength of relationship between the first and second users and the strength of relationship between the first and third users, and wherein determining the aggregate statistics is based on weighing the first and second sets of language statistics.

4. The system of claim 1, wherein the social graph data comprises language statistics regarding posts authored by one or more non-contact users, each of the one or more non-contact users having commented on at least one post authored by the first user within the social networking service.

5. The system of claim 1, wherein the operations further comprise:
generating language data based on the natural language;
transmitting the language data and the content data to a remote computing device; and
receiving updated language data, the updated language data having been generated at the remote computing device based on the language data and the content data.

6. The system of claim 5, wherein the updated language data corresponds to the natural language determined based on the social graph data corresponding to the one or more social graphs.

7. The system of claim 5, wherein the updated language data corresponds to another natural language that is different from the natural language determined based on the social graph data corresponding to the one or more social graphs.

8. The system of claim 1, wherein the operations further comprise associating the content data with the natural language.

9. The system of claim 8, wherein associating the content data with the natural language comprises populating language data of a data set with data indicative of the natural language, the data set comprising at least the content data and the language data.

10. The system of claim 1, wherein the content data is provided in a data set that is received at a computing device associated with the first user.

11. The system of claim 10, wherein the data set is a post data set that is generated in response to a post in the social networking service that is published by the first user.

12. The system of claim 1, wherein the social graph data comprises at least one of:
distances between the first user and other users within one or more social networking services;
language statistics based on posts authored by the first user within the one or more social networking services;
language statistics based on posts authored by contacts of the first user within the one or more social networking services; and
language statistics based on comments authored by non-contact commentators who are also users of the one or more social networking services.

13. The system of claim 1, wherein the operations further comprise:
indicating the natural language as a preliminary language;
transmitting the content data and the natural language as inputs for a language analysis; and
receiving a notification based on the language analysis.

14. The system of claim 13, wherein the notification comprises an indication that the preliminary language is incorrect.

15. The system of claim 1, wherein the operations further comprise receiving a post data set, the post data set comprising the content data and user data, and wherein identifying the author of the text is based on the user data.

16. The system of claim 1, wherein the one or more social graphs are generated based on relationships between the first user and other users of the social networking service.

17. A non-transitory computer storage medium encoded with a computer program, the computer program comprising instructions that when executed by data processing apparatus cause the data processing apparatus to perform operations comprising:
receiving content data, the content data comprising text;
responsive to determining that the content data is insufficient to accurately determine a natural language in which the text is written by determining that a number of characters of the text is less than a threshold number:
identifying an author of the text, the author being a first user of a social networking service;
retrieving social graph data corresponding to one or more social graphs associated with the first user, the social graph data being stored in a computer-readable storage device, the social graph data including a first set of language statistics and a second set of language statistics based on posts respectively authored by a second user and a third user that connect with the first user within the social networking service;
determining aggregate statistics from the first and second sets of language statistics based on a strength of relationship between the first and second users and a strength of relationship between the first and third users; and
determining the natural language that the text is written in as one of a plurality of potential natural languages based on the aggregate statistics included in the social graph data corresponding to the one or more social graphs associated with the author.

18. A computer-implemented method comprising:
receiving content data, the content data comprising text;
responsive to determining that the content data is insufficient to accurately determine a natural language in which the text is written by determining that a number of characters of the text is less than a threshold number:
identifying an author of the text, the author being a first user of a social networking service;
retrieving social graph data corresponding to one or more social graphs associated with the first user, the social graph data being stored in a computer-readable storage device, the social graph data including a first set of language statistics and a second set of language statistics based on posts respectively authored by a second user and a third user that connect with the first user within the social networking service;
determining aggregate statistics from the first and second sets of language statistics based on a strength of relationship between the first and second users and a strength of relationship between the first and third users; and determining the natural language that the text is written in as one of a plurality of potential natural languages based on the aggregate statistics included in the social graph data corresponding to the one or more social graphs associated with the author.

\* \* \* \* \*